United States Patent [19]

Knetzger

[11] 4,288,537
[45] Sep. 8, 1981

[54] ELECTRONIC GAME

[75] Inventor: Robert C. Knetzger, Redondo Beach, Calif.

[73] Assignee: Mattel, Inc., Hawthorne, Calif.

[21] Appl. No.: 111,573

[22] Filed: Jan. 14, 1980

[51] Int. Cl.³ .................... G09B 7/06; A63H 5/00; A63F 9/06

[52] U.S. Cl. .................... 434/169; 46/232; 273/1 GA; 434/261

[58] Field of Search .................... 35/9 C, 35 A; 273/153 R, 1 GA; 46/45, 227, 232; 84/470; 434/261, 169

[56] References Cited

U.S. PATENT DOCUMENTS

| | | | |
|---|---|---|---|
| 3,460,425 | 8/1969 | Kiepe | 35/9 C UX |
| 3,541,706 | 11/1970 | Shapiro | 35/35 A UX |
| 3,562,927 | 2/1971 | Moskowitz | 35/9 C UX |

OTHER PUBLICATIONS

"Squawk Box" by Bennett A. Loftsgaard, Popular Electronics, Mar. 1973, p. 46.

*Primary Examiner*—Anton O. Oechsle
*Attorney, Agent, or Firm*—Reagin & King

[57] ABSTRACT

A toy for playing a number of different games having a housing containing a sound generating circuit and a number of removable game boards providing connections to the circuit. A laminate path affixed to the board and a probe provide means for connecting a resistor to the circuit and for carrying the value of resistor to change the frequency of the sound generated. In specific embodiments the path is broken so that a graphite path defined by a pencil may connect the parts of the circuit. The path is included in each of the games as a key to the play thereof.

4 Claims, 4 Drawing Figures

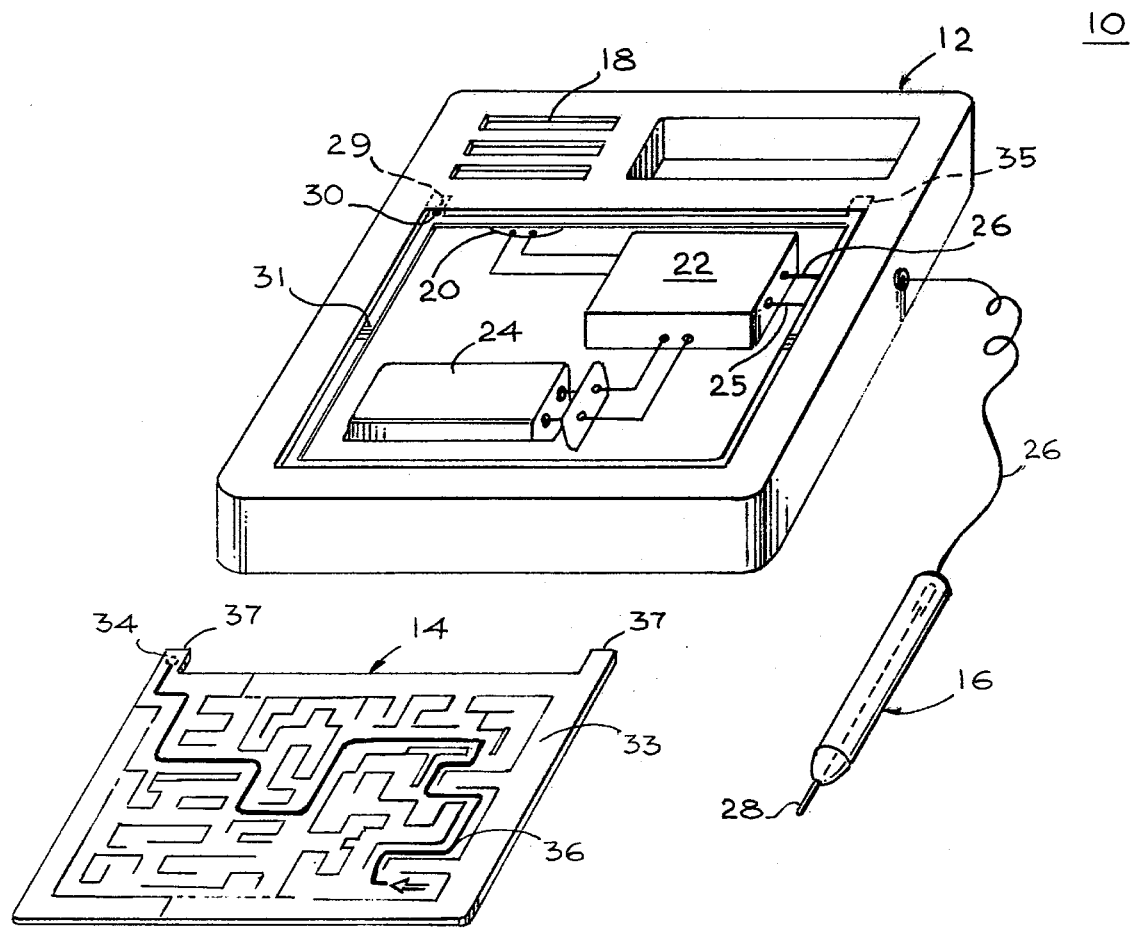
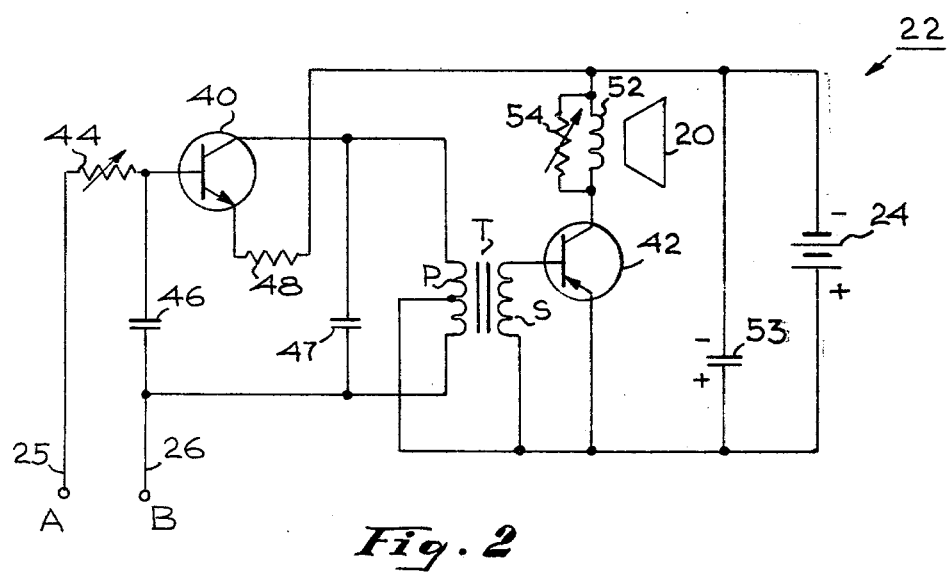
Fig. 1
Fig. 2

ELECTRONIC GAME

BACKGROUND OF THE INVENTION

This invention relates to children's games and, more paarticularly, to children's games having a number of selectable interchangeable game formats utilizing electrical circuitry.

Games of skill and dexterity played with a pencil and paper such as mazes, connect-the-dots, spelling games, and the like have long been known. Such games have been offered to children in various formats all of which are interesting because of the mental stimulation produced. Attempts have been made to increase the play value of such games by adding exciting elements. For example, some of these games have devised to make use of the properties of electrical circuits in order to enhance their play value. Usually, such games are quite expensive and offer an extremely limited format of games of which a child quickly tires.

It is an object of this invention to provide new and improved games for children.

It is another object of this invention to provide a child's toy offering an extensive variety of different games which may be played.

It is still another object of this invention to provide a child's game having multiple play options each of which is enhanced by electrical means for providing game playing stimuli.

SUMMARY OF THE INVENTION

The foregoing and other objects of the invention are accomplished by a child's toy which utilizes an electronic sound generator which provides sounds the frequency of which depend on the value of a resistance. The toy is provided with an extensive array of game cards which make electrical connection to the sound generator and which themselves contain resistance elements. Connections of the various resistance elements to the sound generator are made as a portion of game play by marking the game board with a conductive material such as the graphite from a soft pencil or by touching portions of the resistance elements with a conductive probe connected to the sound generator. The interchangeable game cards are used so that the circuitry produces various noises upon the correct spelling of a word, upon the completion of a maze, upon the connection of dots, upon the production of hidden figures and the like.

Other objects, features, and advantages of the invention will become apparent from a reading of the specification taken in connection with the drawings in which like reference numerals refer to like elements in the several views.

BRIEF DESCRIPTION OF THE DRAWINGS

FIG. 1 is a perspective view of a child's toy constructed in accordance with the invention;

FIG. 2 is a circuit diagram illustrating an electronic circuit for a sound generator which may be used to implement the invention shown in FIG. 1;

DESCRIPTION OF THE PREFERRED EMBODIMENT

Figure 3:
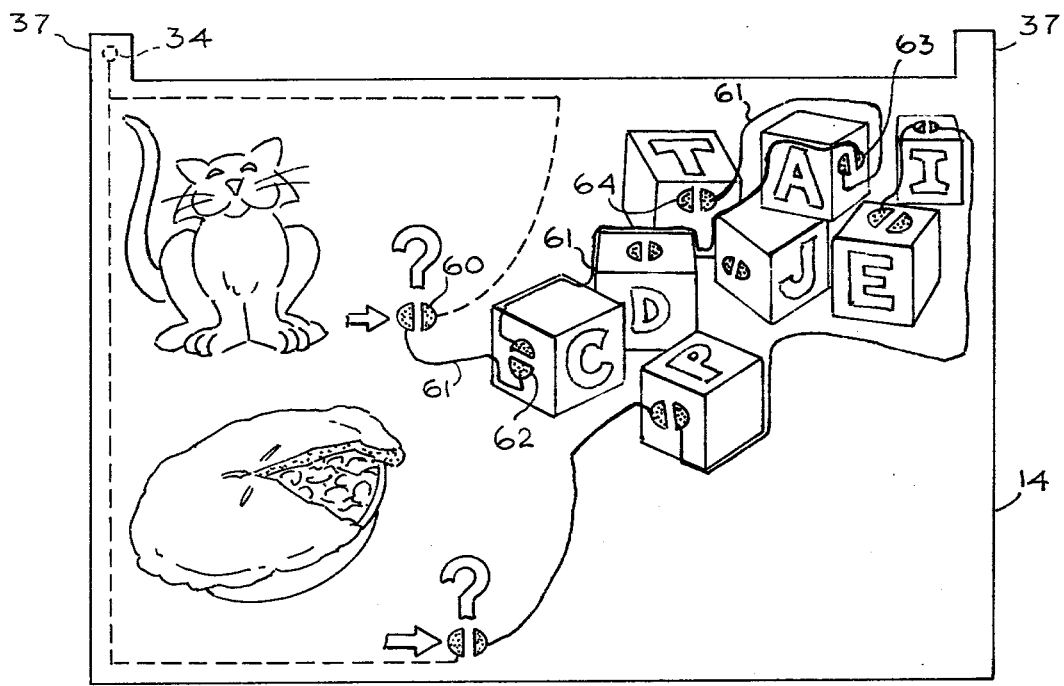
FIG. 3 is an illustration of a first game card which may be used in playing a spelling game in accordance with the invention.

Referring now to the drawings and more particularly to FIG. 1, there is shown a child's toy 10 constructed in accordance with this invention. The toy 10 comprises a housing 12, a game board 14, and a probe 16. The housing 12 may be constructed of a material such as a moldable, high-impact plastic (well known in the art). The housing 12 is formed with an interior which opens through slits 18 on its upper surface below which is mounted a speaker 20. The speaker 20 provides sound which is projected to the exterior through the slits 18. The speaker 20 is electrically connected to an audio frequency generating circuit 22 which receives power from a battery 24. Two wires 25 and 26 project from the generating circuit 22. The wire 25 connects to a contact 30 recessed in a slot 29 on the upper surface of the housing 12 adjacent an opening 31. The contact 26 is connected directly to the probe 16. Projecting from the probe 16 is a conductor 28 which is directly connected to the wire 26.

The game board 14 has an upper surface 33 upon which is placed a pattern which in the particular illustration is a maze. The shortest path 36 through the maze is defined by a resistive material which is deposited or painted on the surface of the board so that the resistance varies with the length, width, and thickness of the path. In a preferred embodiment, the path 36 is a polymer thick film, comprising a thermosetting epoxy or polyester, containing carbon. Such films are sold by DuPont and Methode Development Company. A contact 34 on the lower surface of the game board 14 makes electrical connection to the contact 30 on the housing 12 when projections 37 on the board 14 are slid into slots 29 and 35. The path 36 through pattern 33 on the surface of the game board 14 effectively acts as the variable resistor for varying the output frequency of the generating circuit 22 so that when a connection is made thereto signals will be generated by the generating circuitry 22 to operate the speaker 20. When the conductor 28 of probe 16 touches a portion of the path 36, a signal is generated the frequency of which depends on the resistance of the path 36 between the tip of conductor 28 and the end of the path 36 nearest the contact 30; the nearer the conductor 28 is to the contact 30, the lower the resistance of the path 36. If the probe 16 is moved so that the conductor 28 remains on the correct path for negotiating the maze, the sound will continue and increase in frequency as the maze is negotiated. If the probe 16 is moved off the correct path for negotiating the maze, the sound will cease. Consequently, the toy 10 generates an audio signal for the operator which tells him that he is on the correct path in negotiating the maze and which changes in frequency as he negotiates the maze. The change in frequency of the sound tends to heighten the excitement for a child and adds substantial play value. An alternative embodiment of the same game might provide additional resistive paths of different resistance values on each side of the path 36 (but insulated from path 36) connected to the contact 34; such paths would provide error sounds of frequencies different than that of the path 36 when the probe 16 departed the path 36.

Any number of audio frequency generators are known to the prior art which would accomplish the purposes of the generating circuit 22. For example, FIG. 2 is a schematic drawing of a sound generating circuit offered in kit form by Radio Shack as kit Number 28-215 which may be used to implement the generating circuit 22 shown in FIG. 1. The circuit includes a first transistor 42 which may be a PNP 2SB56. The transistor 40 has base connected to a variable resistor 44 and a capacitor 46. The capacitor 46 and the resistor 44 connect to the two conductors 25 and 26 leading from the sound generating circuit 22 so that the variable resistance of the game board 14 will appear between points A and B in FIG. 2. Bias to the transistor 40 is provided by a battery 24 connected by a resistor 48 to the emitter thereof and by a center tap through a primary winding P of a transformer T to the collector of the transistor 40. The other side of the primary winding P of the transformer T is connected to the capacitor 46. A capacitor 47 is connected across primary winding P. A secondary winding S of the transformer T is connected to the base of transistor 42 and the positive terminal of battery 24. The emitter of the transistor 42 is connected to the positive terminal of the battery 24. The collector of the transistor 42 is connected to a speaker coil 52 of a speaker 20 which is connected to the negative terminal of the battery 24. A variable resistor 54 is placed across the speaker coil 52. The speaker coil 52 drives speaker 20. A capacitor 53 is connected across the battery 24.

The circuit 22 shown in FIG. 2 operates when a resistance is placed between the terminals A and B to oscillate and produce an audio frequency output across the speaker coil 52. The frequency of the output signals increases as the value of the resistance between points A and B is lowered. The output signals from the circuit 22 drives the speakers 20 to produce higher or lower frequency sounds depending on the resistance between points A and B.

The resistance of the path 36 on the pattern 33 is connected between the points A and B by touching the conductor 28 of the probe 16 to a point on the path thereby completing the circuit to the contact 34. Moving the conductor 28 along the path 36 varies the resistance between the points A and B and the frequency of the sound produced by the circuit 22.

In FIG. 3 is illustrated a game board 14 carrying a spelling game which illustrates another embodiment of the invention. The game board 14 has illustrated thereon a game in which it is desired to spell two words, i.e., cat and pie. The word to be spelled is illustrated adjacent the beginning of a path to be connected between the letters of the word. For example, when it is desired to spell the word cat, a path 61 connecting the letters c, a, and t must be connected. The path 61 may be defined by resistive material as described above or by conductive material, either material adhering to the game board 14. The path 61 is broken at each block carrying a correct letter and at a beginning point 60. The path 61 may be completed by penciling in the open area in each of the blocks 60, c, a, and t between two terminals. The graphite of the pencil lead will provide a resistive connection between the breaks in the path 61 so that a connection is made between the contact 34 and the nearest correct letter. If the probe 16 is touched to the path 62, 63, and 64 as each break is filled, it may be used to test each block for correct spelling. The closure of an interval on a correct block will cause the generating circuit 22 to emit a sound indicating that the correct letter has been selected while the closure of an interval on an incorrect letter will produce no sound. The path 61 shown for spelling the word "cat" has been darkened in the drawing for emphasis. In practice, this path 61 would be hidden by the illustrative material on the surface of the game board 14. Spelling the word "pie" is accomplished in essentially an identical manner and completes another path between the contacts 34 and the probe 16.

Figure 4:
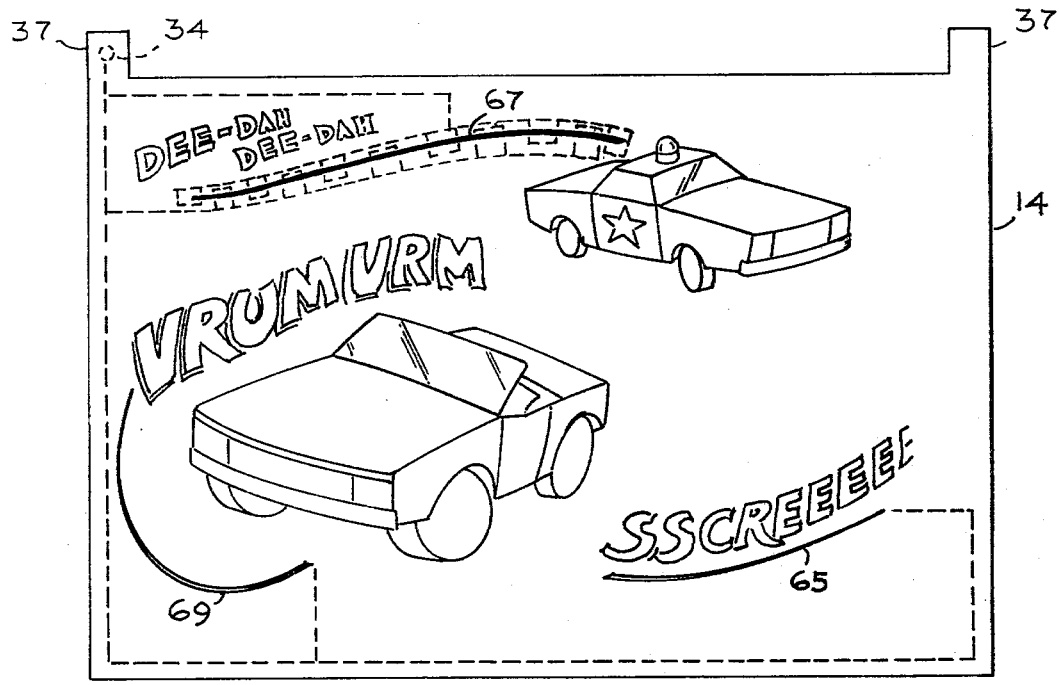
FIG. 4 is an illustration of another game card which may be used in the toy shown in FIG. 1 to generate various well known sounds.

FIG. 4 illustrates another embodiment of the game board 14 which may be utilized with the invention. The particular game board 14 has illustrated thereon various objects such as automobiles which produce distinctive sounds. Various paths on the board 14 are illustrated which include different resistances connected to the contact 30 at one end and adapted to be contacted by the conductor 28 of the stylus 16. By moving the stylus 16 along the path such as path 65, 67, or 69, a sound is produced by the sound generating circuit 22 which emulates the particular sound produced by the object illustrated. For example, a simple resistive path such as the path 69 produces a sound which increases in frequency and emulates the sound made by a car's motor as the revolutions of the motor are increased. The sound produced by the strip 67 on the other hand may be of two intermittently varying frequencies which sound like a police siren. This is accomplished by causing different portions of the path to be alternately connected to the contact 34 by way of alternating high and low resistances each connected to the contact 34 but insulated from one another. Other variations for producing sounds will be obvious to those skilled in the art.

It is obvious that various changes might be made in the form of the cards, of the sound producing circuitry, and of the method of housing the various parts of the invention while retaining the inventive concept. For example, any number of maze games and variations of maze games, such as hidden figure drawing games, might be desired. Other spelling games and variations such as Tic-Tac-Toe games are also possible as are quite complicated sound producing game boards. Thus, while preferred embodiments of the invention have been shown and described, it is to be understood that various other adaptations and modifications might be made within the spirit and scope of the invention.

What is claimed is:

1. A toy for playing a plurality of games comprising a sound generating circuit, a game board, a resistor the value of which determines the frequency of the sound generated by the sound generating circuit, and means associated with the game board for connecting the resistor in the sound generating circuit including a pair of conductors affixed to the game board one of which is connected to the sound generating circuit, means for electrically connecting the conductors by placing a graphite connection between the conductors and means for connecting the second conductor to the sound generating circuit.

2. A toy for playing a plurality of games comprising a sound generating circuit, a game board, resistive material affixed to the top surface of the board, viewable by an operator of the toy, and connectable to the circuit and shaped to form both a resistor and a game path, first means for connecting the resistive material to the sound generating circuit including a conductor affixed to a portion of the resistive material, and second means for connecting the resistive material to the sound generating circuit including a movable conductor which is adapted to be guided by an operator of the toy along the game path while maintaining continuous contact with the resistive material, whereby the distance between the first and second means for connecting the resistive material to the sound generating circuit defines the resistor, the value of which determines the frequency of the sound generated by the sound generator circuit.

3. A toy as claimed in claim 2 further comprising means for providing resistive material affixed to the exposed top surface of the board and shaped to form a second resistor and a second game path, and means for connecting the second resistor to the circuit, including the first and second means for connecting the resistive material to the circuit.

4. A toy for playing a plurality of games comprising a sound generating circuit, a game board, a resistor formed by a path of resistive material affixed to the board and connectable to the circuit, the value of which determines the frequency of the sound generated by the sound generating circuit, means associated with the game board for connecting the resistor in the sound generating circuit including a conductor connected to the circuit and adapted to contact the path, and means for connecting a second resistor to the circuit, where the means for connecting the first and second resistors to the circuit lie adjacent one another.

* * * * *